US007003565B2

(12) United States Patent
Hind et al.

(10) Patent No.: US 7,003,565 B2
(45) Date of Patent: Feb. 21, 2006

(54) CLICKSTREAM DATA COLLECTION TECHNIQUE

(75) Inventors: John R. Hind, Raleigh, NC (US); Binh Q. Nguyen, Cary, NC (US); Marcia L. Peters, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 09/825,097

(22) Filed: Apr. 3, 2001

(65) Prior Publication Data

US 2002/0143933 A1     Oct. 3, 2002

(51) Int. Cl.
     *G06F 15/173*     (2006.01)
(52) U.S. Cl. .................. 709/224; 709/203; 709/227
(58) Field of Classification Search ............... 709/203, 709/224, 227
     See application file for complete search history.

(56) References Cited

U.S. PATENT DOCUMENTS

| | | | | |
|---|---|---|---|---|
| 5,796,952 | A  * | 8/1998  | Davis et al. ............... | 709/224 |
| 5,836,712 | A  * | 11/1998 | Zetterstrom ................ | 403/334 |
| 6,018,619 | A  * | 1/2000  | Allard et al. .............. | 709/224 |
| 6,076,108 | A  * | 6/2000  | Courts et al. .............. | 709/227 |
| 6,081,829 | A  * | 6/2000  | Sidana ..................... | 709/203 |
| 6,278,966 | B1 * | 8/2001  | Howard et al. ............. | 709/224 |
| 6,314,451 | B1 * | 11/2001 | Landsman et al. .......... | 709/203 |
| 6,317,787 | B1 * | 11/2001 | Boyd et al. ................ | 709/224 |
| 6,366,298 | B1 * | 4/2002  | Haitsuka et al. ........... | 715/736 |
| 6,381,632 | B1 * | 4/2002  | Lowell ..................... | 709/224 |
| 6,397,261 | B1 * | 5/2002  | Eldridge et al. ........... | 713/171 |
| 6,466,970 | B1 * | 10/2002 | Lee et al. ................. | 709/217 |
| 6,477,575 | B1 * | 11/2002 | Koeppel et al. ............ | 709/224 |
| 6,516,338 | B1 * | 2/2003  | Landsman et al. .......... | 709/203 |
| 6,567,857 | B1 * | 5/2003  | Gupta et al. ............... | 709/238 |
| 6,601,090 | B1 * | 7/2003  | Gurijala et al. ............ | 709/213 |
| 6,622,168 | B1 * | 9/2003  | Datta ....................... | 709/219 |
| 6,728,763 | B1 * | 4/2004  | Chen ........................ | 709/219 |
| 6,839,680 | B1 * | 1/2005  | Liu et al. .................. | 705/10  |
| 2002/0091736 | A1 * | 7/2002 | Wall ........................ | 707/513 |

FOREIGN PATENT DOCUMENTS

GB           001220098 A2 *    3/2002

OTHER PUBLICATIONS

Florey Kevin, "Whos Been Peeking At My Clickstream?", Fall 1995, Paper for MIT 6.805/STS085, http://www.swiss.ai.mit.edu/6.805/student-papers/fall95-papers/florey-privacy.html.*

(Continued)

*Primary Examiner*—Ario Etienne
*Assistant Examiner*—Ramy M Osman
(74) *Attorney, Agent, or Firm*—Myers Bigel Sibley & Sajovec PA

(57) ABSTRACT

Methods, systems, computer program products, and methods of doing business by improving collection of clickstream data in network exchanges comprising a plurality of related request and response messages. A clickstream cookie is created by an application, and contains a clickstream data collection correlator for messages of a particular transaction. A Uniform Resource Locator ("URL") token is created, and is used both in URLs of messages and in cookies downstream of a cookie jar for locating the application-generated correlator. In preferred embodiments, this application-generated correlator is a unique value which is used to identify related clickstream data once it is collected. A flag may also be used to indicate whether data collection is enabled. No changes are required on client devices or in client software, and there is no dependency on a client to support cookies. Using the disclosed techniques, a particular application may specify varying clickstream data collection requirements for the transactions it generates.

29 Claims, 6 Drawing Sheets

OTHER PUBLICATIONS

Felaciano, et al, "Lamprey: Tracking users on the World Wide Web", Fall 1996, AMIA Annual Fall Symposium, Stanford University, PMID: 8947767, http://www.ncbi.nlm-.nih.gov/entrez.*

Palfreyman et al, "A Protocol for User Awareness on the World Wide Web", 1996, Proceedings of the 1996 ACM conference on Consumer supported cooperative work, ISBN: 0-89791-765-0, pp. 130-139.*

* cited by examiner

```
[14/Mar/2001:08:56:19:357+0500 - 001]  <X@%3.as3.cx.A24.1.240.1>  "CLICKSTREAM=customer45.help.isg"
[14/Mar/2001:08:56:19:357+0500 - 025]  <X@%3.as3.cx.A24.1.240.1>  "http://w3.ibm.com/helpnow.htm"
[14/Mar/2001:08:56:19:893+0500 - 010]  <X@%3.as3.cx.A24.1.240.2>  "http://w3.ibm.com/images/helpnow_logo.gif"
[14/Mar/2001:08:56:19:896+0500 - 011]  <X@%3.as3.cx.A24.1.240.2>  "http://w3.ibm.com/fonts/times.ttf"
[14/Mar/2001:08:56:19:893+0500 - 010]  <X@%3.as3.cx.A24.1.240.2>  "http://w3.ibm.com/scripts/login.js"
```

405, 410, 415, 420

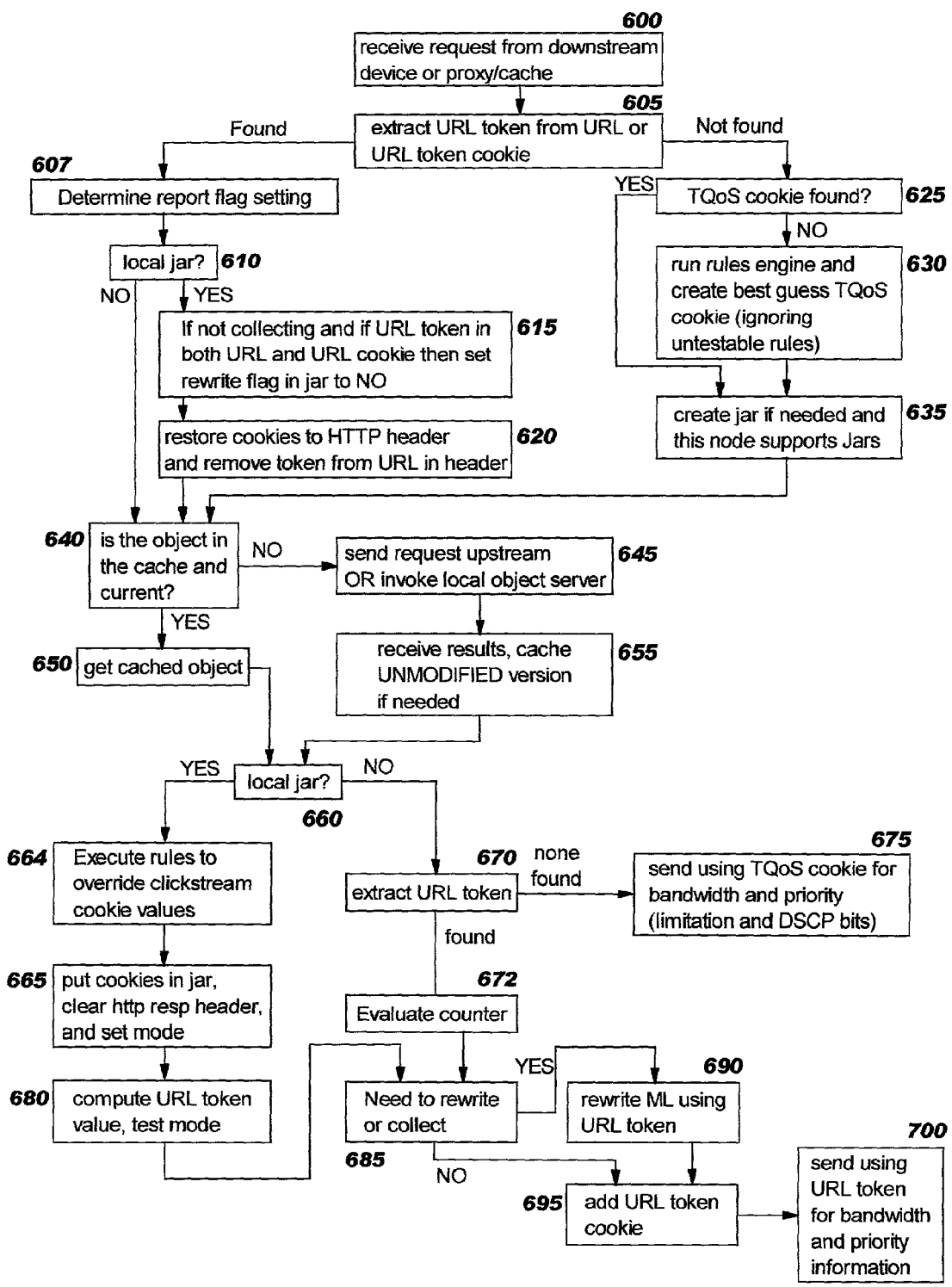

CLICKSTREAM DATA COLLECTION TECHNIQUE

BACKGROUND OF THE INVENTION

1. Related Inventions

The present invention is related to the following commonly-assigned U.S. Patents, which are hereby incorporated herein by reference: U.S. (Ser. No. 09/557,708, filed Apr. 25, 2000), entitled "URL-Based Sticky Routing Tokens Using a Server-Side Cookie Jar"; and U.S. (Ser. No. 09/825,078, filed concurrently herewith), entitled "Quality of Service Improvements for Network Transactions".

1. Field of the Invention

The present invention relates to a computer system, and deals more particularly with methods, systems, computer program products, and methods of doing business by improving the collection of clickstream data (i.e. information about an end user's navigation) in a networking environment.

DESCRIPTION OF THE RELATED ART

Businesses need to understand how effective their Web sites are at communicating with their customers, suppliers, and employees. Ultimately this means collecting clickstream data that shows how the users interact with the site content and then mapping this collected data back to the respective business processes involved. A business may then use this information to determine, for example, "How effective is our spring sale campaign at clearing out our overstock of lawn mowers?" or "What can we do to our self-help customer service application to cut down on the help desk e-mail question volume?".

Traditionally, clickstream data could be collected by keeping detailed Web server logs, perhaps augmented by a cookie. A "cookie" is a limited data object transported in variable-length fields within headers of Hypertext Transfer Protocol ("HTTP") request messages (used when requesting objects) and response messages (used when providing the requested objects). Cookies are normally stored on the client, either for the duration of a session—e.g. throughout a customer's electronic shopping interactions with an on-line merchant—or permanently. A cookie stores certain data that the server application wants to remember about a particular client. This could include client identification, session parameters, user preferences, session state information, or almost anything else an application writer can think of to include within the limitations of the cookie specification.

Collecting and analyzing clickstream data using Web server logs and optional cookie information is called "logfile analysis". Many vendors are using this technique, including WebTrends (which markets a product called "WebTrends Log Analyzer") and Net.Genesis (which markets a product called "net.Analysis"). However, as Web sites increase in size and complexity, often spanning the globe with hundred of servers, collecting and analyzing clickstream data using logfiles becomes increasingly difficult. A few companies are starting to employ a more client-oriented method by embedding references to "clear GIFs" (often called "Web Bugs") in Web pages. The term "clear GIF" refers to use of a very small graphic image, often only 1 pixel by 1 pixel in size when displayed, which is typically clear or transparent. Depending on how the clear GIF reference is encoded in the Web page definition, and depending on the user's actions when viewing the Web page, a request message will be issued from the user's device (i.e. the client) to retrieve the file containing the clear GIF. Because of its small size and transparency, a clear GIF that is rendered on the user's display is relatively unobtrusive in terms of the user device's storage capacity and the user's perception of the Web page. Often, the clear GIF (referred to hereinafter as a Web Bug) uses executable code written in Javascript to report on the content of the respective Web page (i.e. by sending a message with information about the particular page within which the clear GIF was requested). The HTTP request header which requests delivery of the clear GIF also supplies certain types of information about the client, such as the user agent (i.e. browser) in use at the time, what types of encoding this user agent supports, and so forth (as is known in the art). When using this Web Bug technique, the user's browser sends clickstream data directly to a site analysis application.

These traditional means of obtaining clickstream information are doomed to failure in the future for numerous reasons, including:

the inability to distinguish a specific user by the user's Internet Protocol ("IP") address and port number (which is due to a number of factors such as use of Network Address Translation or "NAT", virtual domain hosting, and so forth, which are discussed in more detail in the related applications), thus preventing association of the collected data with a particular user based on these parameters;

objections to use of Web Bugs by various privacy groups, and movement to force support for opt-out provisions (similar to existing cookie opt-out provisions) which, if implemented, may disable the ability for sites to collect basic operational data;

the increasing use of dynamic Web pages whose content cannot be inferred by the respective address, or Uniform Resource Locator ("URL"), from the HTTP request if Javascript is not enabled, thereby preventing full understanding of what the end user was actually viewing when the clickstream data was collected;

the use of network caches to serve static content (wherein requests for Web pages are sometimes intercepted and served without making a full network round-trip, such that the requests do not result in log messages that reach the site analysis location), thereby preventing compilation of a complete picture of what was delivered to the end user;

the tendency of owning Internet Service Providers ("ISPs") to configure their cache servers to ignore caching rules in the HTTP request headers coming from client devices, thereby preventing the caching rules from rendering previously-cached information stale, and serving data from cache anyway in order to optimize point-of-presence ("POP") bandwidth requirements—which also prevents compilation of a complete picture of what was delivered to the end user;

privacy concerns and hacker activity have caused numerous users to configure their browser and/or personal firewall proxy to disable many Web features (including such things as cookies, Javascript, VBscript, ActiveX, Java™ program support, and persistent storage);

the fact that a given Web page consists of a multiplicity of HTTP requests and corresponding replies that may be served by multiple servers and/or caches, making it difficult to assemble and analyze clickstream information based upon receipt of a request at any particular network location; and pervasive devices and personal digital assistant ("PDA") browsers may filter the types of content to accept, including GIFs or images (e.g, due to the inability of the devices to store large amounts of data), and hence the clear GIF resource used for a Web Bug would not be retrieved—in which case the Web Bug technique would be completely ineffective for clickstream data collection.

In view of these disadvantages of current approaches, what is needed is an improved technique for collecting clickstream data.

SUMMARY OF THE INVENTION

An object of the present invention is to provide a technique to improve collection of clickstream data.

Another object of the present invention is to provide this technique by transmitting, over the course of a series of related message exchanges between a client and a server, information that enables tracking an end user's navigation path.

A further object of the present invention is to provide a technique which enables identifying the inventory of objects that comprise the documents viewed by an end user during a transaction.

Still another object of the present invention is to provide this technique wherein the series of related message exchanges may occur between a particular client and one or more servers or other network devices.

Yet another object of the present invention is to provide an improved clickstream data collection technique by defining a new type of cookie known as a "clickstream cookie".

A further object of the present invention is to provide this technique wherein clickstream cookies are stored at location(s) other than client devices.

Another object of the present invention is to provide this technique with no assumptions or dependencies on a client's ability to support cookies, Javascript, VBScript, ActiveX, Java programs, GIF or image files, and/or persistent storage.

Still another object of the present invention is to provide this technique without requiring changes to client device software.

An additional object of the present invention is to enable improved clickstream data collection and analysis even though the addressing information of an end user's client device may not appear to remain consistent within the multiple messages of a transaction.

A further object of the present invention is to provide improved clickstream collection which accounts for objects retrieved from network cache servers, proxies, and/or surrogates.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for improving collection of clickstream data over a series of related messages exchanged between computers in a networking environment. In one embodiment, this technique comprises determining a clickstream correlator value to be applied to the related messages; annotating each of the related messages, except a first incoming one thereof, with information reflecting the determined clickstream correlator value; and transmitting at least one of the annotated messages for delivery to a particular one of the computers. The clickstream correlator value is preferably a value that indicates whether clickstream data collection is being performed and/or a value that is used to correlate stored log entries created for the related messages. The technique preferably further comprises storing the determined clickstream correlator value for use when transmitting subsequent ones of the related messages to the particular computer.

The particular computer may be a client computer, and transmitting the annotated messages to the client computer preferably further comprises: receiving the transmitted annotated message at the client computer; and automatically returning the determined clickstream correlator value to a server computer in each subsequent one of the related messages. The transmitted annotated message preferably includes an object reference that is annotated to carry the determined clickstream correlator value, and wherein the automatic returning is enabled by the annotation of the object reference.

One of the annotated messages may be a response that serves a Web page to the particular computer, or a request from the particular computer for a Web page or for a Web object. In the former case, one of the subsequent ones of the related messages may be a request for information referenced by the Web page or a request for information selected from the Web page by a user of the particular computer.

The determined clickstream correlator value may be stored in a server computer. The annotation may further comprise storing the information reflecting the determined clickstream correlator value as part of a token in the annotated messages. The token may be used to modify a URL from a header of selected ones of the related messages. The token may further comprise information enabling identification of the particular computer and another computer which performs the transmitting, as well as identification of a storage area used to store the determined clickstream correlator value for the related messages.

The technique preferably further comprises using the determined clickstream correlator value when logging records reflecting the annotated messages, and using the logged records to reconstruct a user's navigational experience during the series of related messages.

The present invention may also be used advantageously in methods of doing business, for example by providing improved techniques for collecting clickstream data in Web shopping applications or in other e-business applications having operations or transactions for which the collected clickstream data proves advantageous, and also for providing new revenue streams to companies that may use the teachings disclosed herein to provide improved clickstream data collection software and/or services.

The present invention will now be described with reference to the following drawings, in which like reference numbers denote the same element throughout.

BRIEF DESCRIPTION OF THE DRAWINGS

FIG. 4 illustrates a sample collection of clickstream data generated according to the present invention; and FIGS. 5 and 6 provide flowcharts depicting logic which may be used to implement preferred embodiments of the present invention.

DESCRIPTION OF THE PREFERRED EMBODIMENTS

Figure 1:
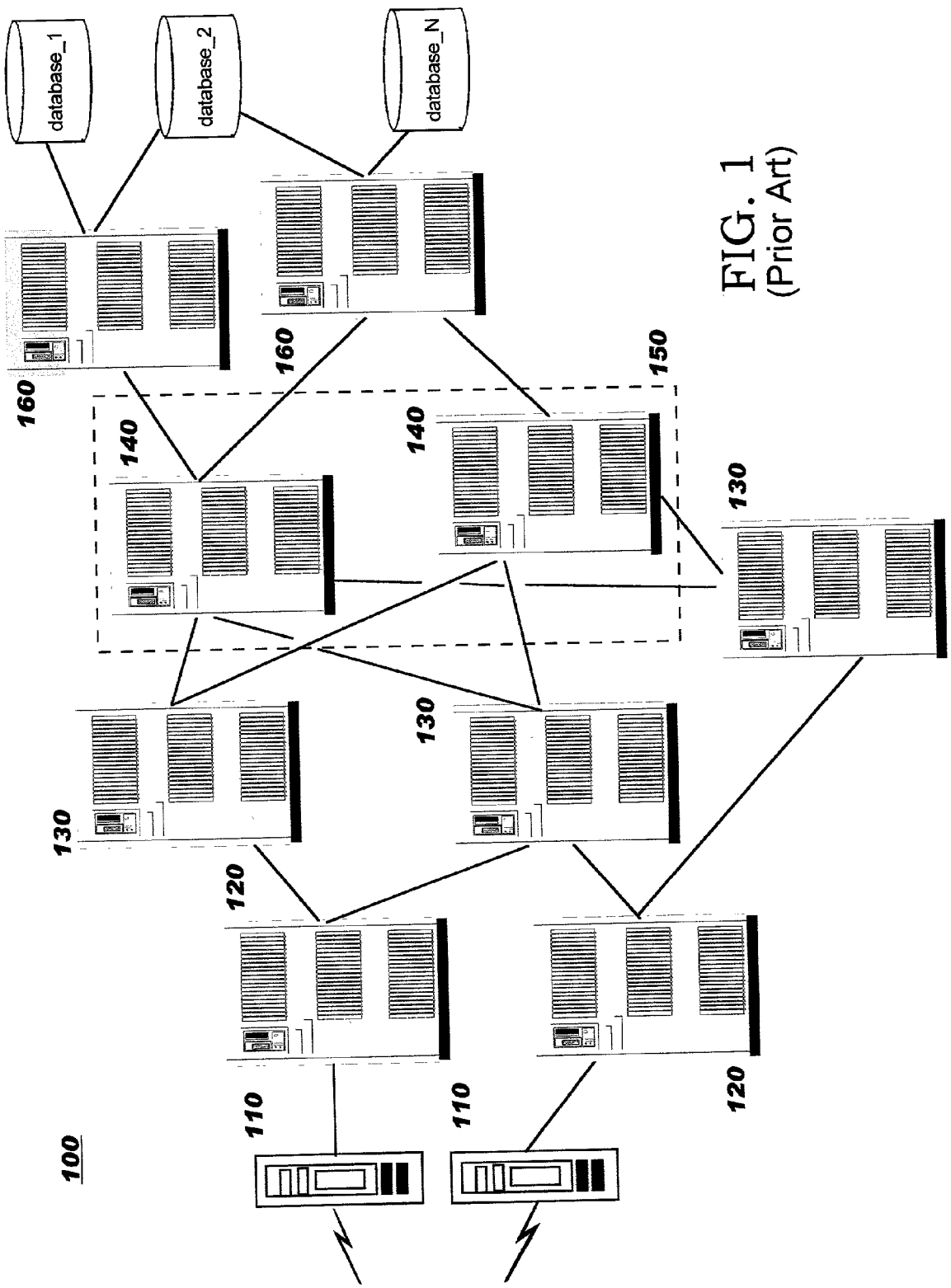
FIG. 1 is a diagram of a server site comprising multiple server devices, according to the prior art.

The present invention defines a clickstream data collection technique which enables collection of granular performance, hit, and user navigation intelligence. Data is collected regarding an end user's navigation path among a series of Web documents, and an inventory of the objects contained in the rendered documents is also collected. This is so even when documents and/or contained objects may be stored at a client-side cache or network cache. The present invention builds on techniques described in the related inventions, U.S. Ser. No. 09/557,708 titled "URL-Based Sticky Routing Tokens Using a Server-Side Cookie Jar" (hereinafter referred to as "the first related invention") and U.S. Ser. No. 09/825,078 titled "Quality of Service Improvements for Network Transactions" (hereinafter referred to as "the second related invention"). The present invention may be used, however, without the teachings of the second related invention, as will be described.

The teachings of the first related invention enable a server affinity to be defined for a particular client (without requiring the client's IP address to be unique), thereby bypassing load balancing for related messages within that affinity, and restore Web applications' ability to rely on the presence of cookies (with no assumption on the ability of a particular client to support cookie functionality). Instead, any cookies inserted into an outbound HTTP header are extracted prior to delivery of the response message to the client, and are stored in server-side storage referred to as a "cookie jar". After extracting the cookies, if the outbound response includes a markup language document, then any embedded URLs within that markup language document referring to or relative to the session's server are rewritten in a detectable manner to include what is defined as a "sticky routing token". A sticky routing token is a client-unique URL that indicates, inter alia, where in the network the cookie jar for this particular client session resides. The rewritten URL format is transparent to the client. If one of the rewritten URLs is subsequently referenced (e.g. by the user clicking on a link to that URL, or rendering a page which includes the URL), then the sticky routing token is automatically returned on the request message which is sent to retrieve the content of that URL.

The first related patent also teaches inspecting the HTTP header of an inbound request message upon arriving at the server side, searching for a sticky routing token. If one is found (and if its contents are valid and not stale), then it is removed from the header. (Otherwise, a new sticky routing token is created.) A key is extracted from the sticky routing token (or other similar storage), where this key identifies the cookie jar in which this session's cookies are stored. The cookies are then retrieved, inserted into the HTTP request header, and forwarded to the application for use within the server-side environment as necessary to service the incoming request.

The second related invention builds on this foundation, and adds additional fields into the sticky routing token to create a "URL token" (i.e. a markup string for use when rewriting URLs). These additional fields provide quality of service parameters that are to be used when routing related messages for a particular transaction. The second related invention thereby enables transaction-specific quality of service information (such as relative transmission priority and available last-mile bandwidth) to be determined and communicated through the network over the course of the transaction, and allows a consistent treatment to be used for delivery of all objects transmitted within that transaction (including objects that may be referenced from a rendered document and/or retrieved when the end user clicks on a URL referencing an object). The second related invention also defines a technique whereby the cookie jar logic may be placed on one or more of a Web application server, a server-site edge server or surrogate, and an in-network branch side edge server or caching proxy.

A primary goal of the present invention is to allow selective collection of clickstream data for both dynamic and static pages, including same-site objects referenced by such pages (scripts, fonts, frames, forms, images, etc.) in a way that avoids the problems associated with the traditional clickstream data collection approach. As will be explained in more detail herein, this is accomplished by inserting clickstream data collection information within URL tokens in all URL references to a particular server site in a way that is not dependent on a browser, proxy/gateway, or pervasive device's ability to support images, cookies, Javascript, Java, VBscript, ActiveX, persistent storage, or even cache control headers.

Optionally, URL tokens may also be transmitted in "URL token cookies" within HTTP request and response headers, in cases where the client does support cookies. Use of URL token cookies is described in detail in the second related invention. A URL token cookie is a cookie which stores the URL token according to the second related invention, or, when the present invention is used without the transactional quality of service ("TQoS") features of the second related invention, "URL token cookie" shall be construed to mean a sticky routing token according to the first related invention which is augmented with clickstream data collection information using the teachings of the present invention.

The present invention also enables reporting cache hits (i.e. objects that are served from a client-side or network cache location, rather than by sending a request further into the network) to a site analyzer.

The term "server site" as used herein refers to the collection of server nodes that serve Web content associated with a given fully-qualified domain name. FIG. 1 provides a diagram of a representative server site 100, which may (for purposes of example) serve content for a domain name such as "www.ibm.com". This example server site 100 comprises a cluster 150 of application servers 140 (such as IBM WebSphere® application servers); several back-end enterprise data servers 160 (such as IBM OS/390® servers running the DB/2, CICS®, and/or MQI products from IBM); several Web servers 130 (such as Apache, Netscape, or Microsoft servers; note that the application server and Web server are often co-resident in a single hardware box); several firewalls 110; and several reverse proxies/caches/load balancers 120 (such as the IBM WebSphere Edge Server). ("WebSphere", "OS/390", and "CICS" are registered trademarks of IBM.)

The term "transaction" as used herein refers to a sequence of related request and response messages that are exchanged to perform a unit of work on behalf of a particular client. For example, a typical electronic commerce transaction typically comprises a sequence of related actions such as browsing an on-line catalog, selecting one or more items of merchandise, placing an order, providing payment and shipping information, and finally confirming or canceling the entire transaction. The server must be able to remember (or at least have access to) information throughout the scope of this transaction, such as the items that have been ordered and client identification that has been provided (perhaps during individual message exchanges). The term transaction is used herein in a generic sense, referring to message exchanges of an arbitrary operation. (Note that there is no dependency on each incoming request of the transaction actually being served by the same server. Instead, multiple redundant servers may operate to service a transaction's requests, provided that the cookie jar as defined herein is available to all such servers through some type of shared or commonly-accessible storage.)

The term "markup language document" as used herein refers to documents encoded using the Hypertext Markup Language ("HTML"), Wireless Markup Language ("WML"), Extensible Markup Language ("XML"), or any other similar type of markup language that may be used for encoding structured documents. Furthermore, reference herein to use of HTTP messages is for purposes of illustration and not of limitation. Other similar protocols may be used alternatively, including but not limited to the Secure Hypertext Transfer Protocol ("HTTPS").

Figure 2:
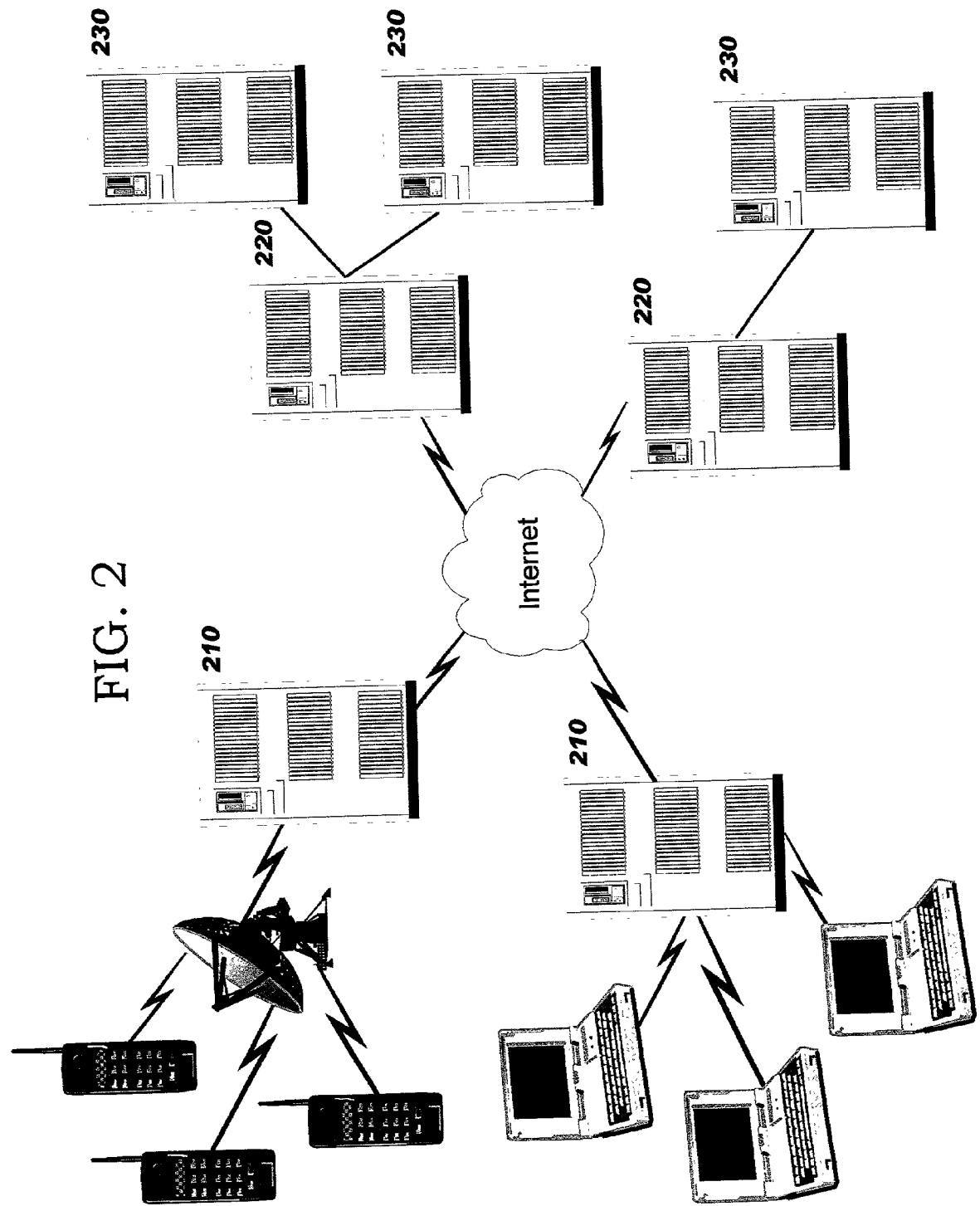
FIG. 2 is a diagram depicting an example of a networking environment in which the present invention may be used, illustrating preferred placement locations for the functionality of the present invention.

Referring to FIG. 2, the cookie jar logic used by the present invention may be placed on one or more of web application server 230, a server-site edge server or surrogate 220, and an in-network branch side edge server or caching proxy 210. This cookie processing function is enhanced with logic to (1) create and interpret clickstream cookies, (2) create and interpret rewritten URLs containing clickstream data collection information, (3) report clickstream data collection information to a site analyzer, and (4) optionally, fetch and evaluate clickstream data collection policy from a policy repository. The unique URL format generated when using the present invention for clickstream data collection forces selected request messages to return to an edge server which implements the teachings of the present invention (or, alternatively, to a network cache augmented according to the present invention) once for each Web object, even though the document content is available from cache, thus providing a more accurate representation of the user's navigational experience than is available in the prior art.

Figure 3A:
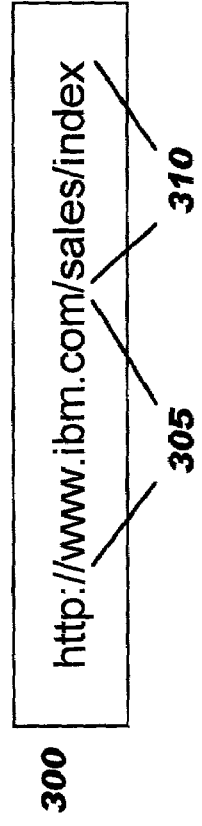
FIGS. 3A and 3B illustrate the structure of a URL of the prior art (including those which are augmented according to the first-mentioned related invention)
Figure 3B:
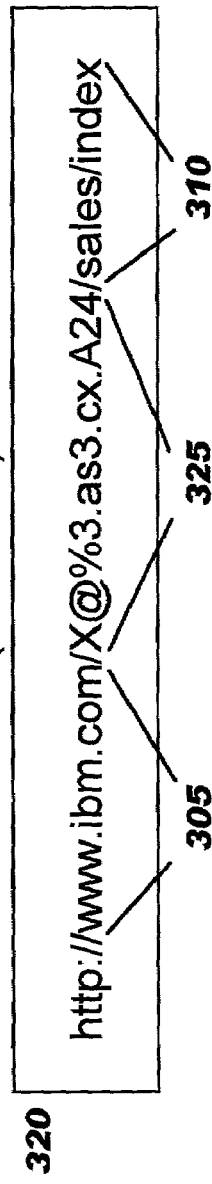

FIG. 3A depicts a URL 300 of the prior art which does not support the cookie jar processing disclosed in the related inventions. As is well known in the art, this URL format includes a server address (or domain name) portion 305 and a path portion 310. The URL format defined by the first related invention is shown in FIG. 3B. This example UTRL 320 contains identical values for the server address 305 and path 310, but now a sticky routing token 325 has been inserted between them. In this stylized example (which does not represent the real effects of modified base 64 encoding, which would make visual identification of fields in the token impossible), the elements of the sticky routing token enable identifying a specific server, client, session, and cookie jar. (Refer to the Sticky Routing Token patent for a detailed discussion of how the sticky routing token is created and processed, and the meaning of its contents including a definition of how modified base 64 encoding, which uses only six bits of each byte, is used therein.) The second related invention defines additional fields 350, 355 for the sticky routing token (shown in FIG. 3C within the URL token 345), where the added fields carry quality of service information. In preferred embodiments of the second related invention, the added fields comprise information about the relative priority 350 and available bandwidth 355 for a particular transaction, with a goal of enabling (inter alia) the end user to have a predictable and consistent interaction with the application generating that transaction.

Figure 3C:
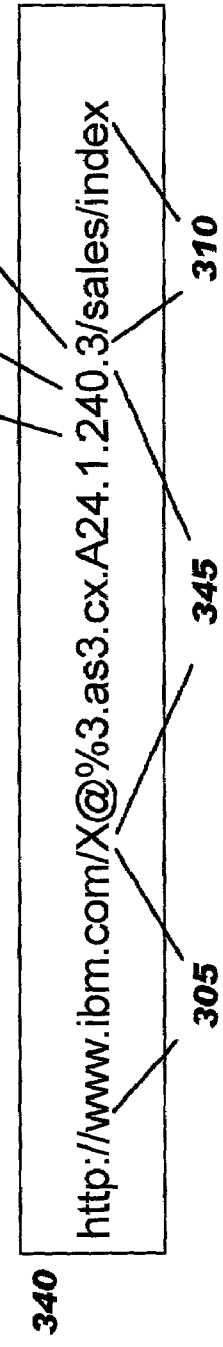
FIG. 3C illustrates the URL structure used by preferred embodiments of the present invention.

According to preferred embodiments of the present invention, an additional field is added to the URL token to carry information used for clickstream data collection. This field preferably comprises the modified base 64 encoding of a counter used for ordering a sequence of collected clickstream log entries, and is shown in FIG. 3C as element 360 within the URL token 345. (As stated earlier, the present invention may also be used advantageously without the features of the second related invention. In this case, fields 350 and 355 are omitted from the URL token 345.) Note that the un-encoded token length could be used to determine which of the variations in formats was applicable.

A "clickstream cookie" is defined for use by the present invention, and is preferably transmitted from an executing application to selectively enable or disable clickstream data collection on a per-transaction basis (using application-specific criteria which do not form part of the present invention). In an optional enhancement, described below with reference to Blocks 664 and 680 of FIG. 6, collection may also be enabled or disabled temporarily during a particular transaction. This clickstream cookie is inserted in outbound HTTP response messages, preferably by means of an application programming interface ("API") command or method invocation, and preferably uses syntax such as "Clickstream=correlator-value". A non-null correlator value implies that clickstream data collection is enabled for this transaction. In the optional enhancement, an additional enablement flag may be added to the clickstream cookie, where this flag is then used to determine whether the data collection is enabled at a point in time (and where the correlator value may therefore remain set to a non-null value even when data collection is temporarily disabled). This clickstream cookie may be inserted in addition to, or instead of, the TQoS cookie of the second related invention. Furthermore, while the clickstream cookie is preferably used in addition to the server affinity cookie described in the first related invention, the server affinity cookie is not strictly required. Note that the clickstream cookie inserted into the outgoing HTTP response header is to be distinguished from the clickstream counter field in the URL token 345 of FIG. 3C; when a clickstream cookie is inserted into a header, it is inserted in an analogous manner to inserting cookies of the prior art. Application programs that are aware of clickstream data collection preferences, and which insert clickstream cookies into outbound response headers, avoid the need to modify the Web application server; the present invention can therefore work with any Web application server.

The correlator value transmitted in a clickstream cookie is preferably generated by the application as a unique identifier that can be used by site analysis logic to reassemble log entries for a particular transaction. As stated above, a zero or null correlator value preferably indicates that data collection is disabled, and a non-zero or non-null correlator value indicates that data collection is enabled; or, alternatively, a separate flag may be added to the cookie for this purpose. In a further optional aspect of the present invention, a URL-based rule evaluation technique may be supported which allows collection of clickstream data for a particular transaction (or for individual messages of a transaction) to be enabled based on administrative policy information.

In preferred embodiments, the clickstream cookie is used in message flows on the server side of the network between the application server and the location where the cookie jar for a particular transaction is found. (If there is no cookie jar, then the cookies preferably flow all the way to the browser.) When an outbound response message transmitted from the application server reaches the cookie jar location, the clickstream cookie and any other cookies that may be present are removed from the header and stored in the cookie jar, and a URL token (which includes clickstream data collection information, as illustrated in FIG. 3C) is generated.

The URL token flows in several different manners. First, the URL token flows between the cookie jar and the client as the value of a URL token cookie, which is always sent downstream (in case the client accepts cookies). Second, the URL token flows in rewritten URL links of markup language documents being transmitted downstream. (Note that in preferred embodiments, rewriting of markup language documents is always done when clickstream data collection is active, so that a node which supports the present invention will be able to see and report on the related object references triggered from the browser evaluation of that markup language syntax. The token in the URLs referencing objects with the markup language document make the name of the first reference to a given object unique in the eyes of those caches in the network path which do not implement the present invention, including the browser's local cache, and hence forces these caches to send the request for the object upstream until it is received by a node which implements the present invention. Third, the URL token flows in a URL token cookie which is created for storing the URL token, and which is sent upstream from a downstream device that supports cookies (e.g. from an edge server to an application server owning the cookie jar). Finally, the URL token flows as part of a rewritten URL in an upstream request (e.g. from a client to an edge server) if the client does not support cookies or if clickstream data collection is active, and also preferably if an upstream server/proxy is unsure of cookie support.

When an incoming request message from the client reaches the cookie jar location, if a URL token is present either in the request URL of that message or as a URL token cookie value, it is removed from the respective request URL and/or the URL token cookie is removed from the header; and it is used to locate the cookies for this session (e.g. by using the key field from the URL token to locate the cookie jar). These cookies are then added to the HTTP request header before the message is forwarded on toward the application. Otherwise, when there is no URL token in an incoming message, and a clickstream cookie is not present in the HTTP headers, a clickstream cookie may optionally be created by using a rules engine (see the discussion of Block 664 of FIG. 6, below).

When clickstream data collection is enabled for a particular transaction, log entries are generated by the cookie jar processing functionality and are preferably stored at that location temporarily, and then periodically dumped to a site analyzer repository.

FIG. 4 illustrates a sample collection 400 of clickstream log entries that may be generated. This collection includes 5 log entries, depicted in FIG. 4 as 5 lines of text in a log file having a text format. These log entries may reflect a user's navigation while obtaining on-line help, for example, as the user views a help page (and as various referenced images, fonts, and scripts are retrieved for rendering). Each log entry preferably comprises (1) a date and time stamp information 405, (2) a URL token value 410, and (3) a modifier 415. (Additional information may be included in each log entry if desired.) The date and time stamp information 405 preferably indicates when the function started, and its duration, and may be expressed in Greenwich Mean Time. For example, the date and time stamp of the first sample entry is shown as "14/Mar/2001:08:56:10:357+0500−001", indicating a function beginning at 8:56:10:357 Eastern Time (i.e. 5 hours and 0 minutes offset from GMT, as indicated by "+0500") and lasting for 1 millisecond (where this duration is indicated in the example as "−001"). The URL token value 410 is preferably logged using modified base 64 encoding, as it actually appeared in the request URL, so that it is simply printable text characters. (The values shown in the sample collection use the stylized URL token representation, as described above with reference to element 345 of FIG. 3C.) Note that each URL token value 410 contains a clickstream counter, as shown at 420; this counter has been described above with reference to element 360 of FIG. 3C. The modifier value 415 is preferably either (a) the clickstream cookie, including its value (e.g. "CLICK-STREAM=...""), as shown in the first sample log entry, or (b) a URL, without its URL token, as shown in the remaining log entries. A log entry containing a clickstream cookie is created whenever the node containing the cookie jar creates a new URL token, where the bits included in the hash are changed. This allows the site analyzer to relate the other URL-style log entries back to this entry's correlator, for example when URL-style log entries are created and sent from a downstream cache. A log entry using URL-style values at 415 is created when a cache or edge server implementing the present invention serves an object whose request URL token had a non-zero clickstream counter.

The first related invention defines a technique for ensuring the validity of a rewritten URL (e.g. to detect modification of the sticky routing token by a hacker or perhaps by a downstream device) by computing a checksum or hash on the fields comprising the rewritten portion of the URL. (The defined technique is also preferably used with the second related invention.) This checksum may be computed using an algorithm such as the Secure Hash Algorithm, or "SHA-1". The checksum is also preferably used to detect the presence of a URL that is rewritten according to either of the related inventions, whereby it is assumed that the value in a particular location within a URL is a checksum from a rewritten URL; the hashing algorithm is then re-computed over the fields that are included within the checksum of the related inventions, and if the re-computed checksum matches the received checksum then it can be assumed (with a very high degree of certainty) that the URL is a rewritten URL according to one or both of the related inventions. (Refer to the first related invention for a more detailed discussion of the contents of the sticky routing token, as well as how that token is created and processed. Furthermore, the first related invention explains in more detail how an incoming sticky routing token is validated and checked for freshness, in order to ensure that a reference to a server-side cookie jar is properly within the current session.)

The technique defined in the first related invention for detecting the presence of a rewritten URL, and for ensuring its validity, is also used with preferred embodiments of the present invention. However, it is important to note that the clickstream counter carried within the URL token in a rewritten URL, according to the present invention, may change from one message to another; because of this expected change, the clickstream counter is preferably not covered by the checksum.

In preferred embodiments, the server-side edge server is responsible for inspecting and modifying URLs in request and response headers to implement the cookie jar processing that supports improved clickstream collection. In other embodiments, clickstream cookie processing may be performed at other locations, as will be described below.

Figure 5:
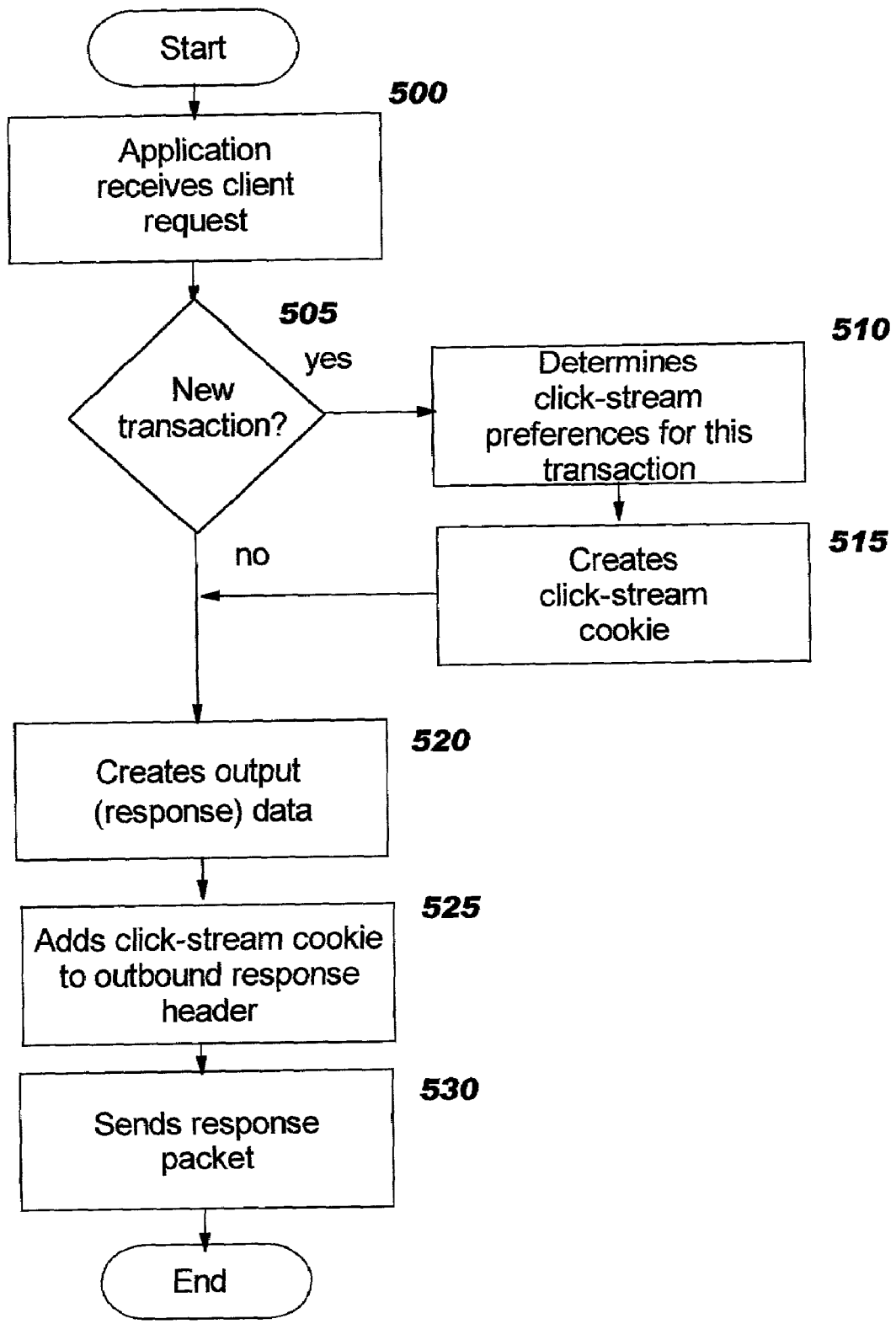

Referring now to the flowchart in FIG. 5, logic is depicted which may be used within an application to provide a clickstream cookie for correlating the messages of a transaction, according to preferred embodiments of the present invention. Upon receiving an incoming client request (Block 500), at Block 505 the application checks (using prior art techniques) to see if this request begins a new transaction. If so, then Blocks 510 and 515 are executed. Block 510 determines the clickstream preferences for this transaction. Preferably, an application generates clickstream cookies for all responses it generates, where a value in each cookie indicates whether clickstream data collection is to be performed according to application-specific criteria. For example, clickstream data collection may be enabled only for selected types of transactions created by the application, or the application may use administrative rules to determine how clickstream data collection is to be enabled. When rules are used, these rules may specify that URLs are to be analyzed, and that enabling clickstream data collection depends on finding certain values in those URLs. This approach may be useful, as an example, when analyzing the traffic flow to and/or from particular heavily-loaded servers.

If the transaction is not new (i.e. the test in Block 505 has a negative result), then the logic in FIG. 5 presumes that the transaction's clickstream preferences have already been determined, and that a clickstream cookie has already been generated and stored in the cookie jar. (It will be obvious to one of ordinary skill in the art how the logic of FIG. 5 may be modified when this presumption does not hold for a particular implementation. For example, an additional test may be added to determine whether a clickstream cookie already exists in the cookie jar, and to create one if not.)

As stated earlier, in preferred embodiments of the present invention, a clickstream cookie comprises a correlator value and may optionally store an enablement flag. When the correlator value is zero or the enablement flag, when used, is off, then clickstream data is not being collected for the document or object carried in the payload of the request or response message. When the correlator value is non-zero or the enablement flag, when used, is on, then clickstream data is being collected, and the correlator value may be used to determine which clickstream log entries stored at a site analysis repository belong together. When the logic of FIG. 5 detects a new transaction for which clickstream data is to be collected, the clickstream correlator created for the clickstream cookie in Block 515 is preferably generated as a unique non-null value which the site analyzer, which will collect the clickstream flow, understands. (This value is subsequently inserted into the URL token, as the value of element 360 of FIG. 3C, during the processing of FIG. 6, described below.) The actual value used for the clickstream correlator is an implementation-specific decision. What is required is that the application and site analyzer both understand the values, and that the semantics for a null value and a non-null value are coordinated as described herein (i.e. a null value means do not collect clickstream data, and a non-null value means collect and forward clickstream data to the site analyzer).

The application then generates output data for the transaction, in an application-specific manner using prior art techniques which do not form part of the present invention (Block 520). (As will be obvious, the ordering of Blocks 505 through 520 may be altered in a particular application without deviating from the scope of the present invention.) The clickstream cookie is then inserted into the outbound HTTP header (Block 525) preferably in the same manner used to insert cookies in the prior art, and the response message is sent from the application to the next downstream device (Block 530).

For purposes of illustration (and not of limitation), the discussions herein presume that the enhanced cookie-jar support of the present invention resides in a server-site edge server (such as server 220 of FIG. 2), and that all flows to and from the application server (such as server 230 of FIG. 2) traverse this edge server. (One can also construct a more complex example with a hierarchy of servers implementing aspects of the present invention.)

The manner in which an edge server processes clickstream cookies and clickstream data collection information in URL tokens will now be explained in detail with reference to the logic in FIG. 6. The logic in FIG. 6 depicts the processing that occurs at an edge server adapted to the present invention, as related to clickstream support, and addresses processing of incoming client request messages as well as processing of outbound response messages created according to FIG.

At Block 600, the edge server receives an incoming request message from a downstream client device or perhaps from a downstream proxy or cache. In Block 605, the URL token is obtained. This comprises evaluating the URL of this request message to determine whether it contains a URL token (or, alternatively, if the incoming request message includes cookies, then a URL token cookie may be extracted, as described in the second related invention). Using similar techniques to those described in the first related invention, the presence of a URL token can be detected in the incoming URL by assuming that a URL token does exist within the URL, and then assuming that a fixed group of bytes from that URL contains a checksum. An algorithm is then used to compute a new checksum over the bytes in which the URL token should be found, and this new checksum is compared to the "assumed" checksum value. If they match, then it can be assumed that a URL token is present. Preferably, the freshness of the URL token is also verified in the same manner described in the first related invention, and if the URL token is not fresh, then it is considered as being not found.

If Block 605 finds a URL token, control reaches Block 607; otherwise, control transfers to Block 625. Block 607 checks to see if the counter (see element 360 in FIG. 3) in this URL token has a non-zero value, indicating that clickstream data collection is enabled for the transaction to which the incoming request pertains (or, for this particular request message, when an application may alter the data collection enablement setting during a transaction). When the token is non-zero, a flag which referred to herein as the "report" flag is set to indicate that this request message should be reported to the site analyzer; otherwise, the report flag is not set. This flag will be examined at Blocks 675 and 700, where normal logging occurs (i.e. normal log entries preferably contain the date and time stamp of the arrival of a request, as well as a date and time stamp of when the respective response was sent). Processing then continues at Block 610, which asks if the cookie jar is stored locally. If it is not, then presumably it is stored at an upstream device and control transfers directly to Block 640. If the cookie jar is stored locally, however, then Block 615 checks to see if (1) the incoming request's counter value is zero and (2) a URL token exists in both (a) the URL of this incoming request message (i.e. this is a rewritten URL), and (b) a URL token cookie in the incoming request header. If a URL token cookie is found in the request header, then this client supports cookies and no clickstream data is being collected, so state information can be transmitted to and from the client using cookies, rather than by URL rewriting (which is a more expensive operation). Therefore, when the conditions tested in Block 615 are all true, a rewrite flag for the cookie jar is set to "No" to preferably suppress further URL rewriting for this transaction. When the incoming counter is non-zero, clickstream data is being collected for this request so the flag indicating whether URL rewriting may be bypassed is not modified. In that case, URL rewriting is always performed for outgoing markup language documents. Block 620 then restores the clickstream cookie and other available cookies from the local cookie jar to the header of the incoming request (using a key value to locate the cookie jar for this particular transaction, as described in detail in the first related invention), and modifies the URL in this request by removing the URL token (if present), in case it is necessary to forward the request upstream.

When no URL token was found at Block 605 and the present invention is implemented along with the second related invention, Block 625 asks if there is a TQoS cookie for this request. It may be, for example, that this is the first request of a new transaction. If a TQoS cookie is found in the header of the incoming request (and if it is considered current as perhaps deduced from optional values in the cookie such as a time stamp), then control transfers from Block 625 to Block 635; otherwise (no TQoS cookie or a stale cookie as deduced from optional values), Block 630 attempts to create TQoS values using locally-available information. Preferably, this comprises running a rules engine to create the edge server's "best guess" about what TQoS values are appropriate, and using those values to create a TQoS cookie which is placed in the HTTP request header (or overlays the existing stale cookie). Note that any rules which use conditions that are not testable by the edge server (e.g. because they rely on information which is not available locally) are preferably ignored in this process. After finding the TQoS cookie or creating a new one or freshening a stale one, a new cookie jar is created (Block 635) if none exists and if this edge server supports cookie jar processing.

Block 640 asks whether the object requested by this incoming request message is found in the local cache and is current (i.e. able to be served). If either of these conditions is false, then at Block 645 the request message is forwarded to the upstream device (or perhaps a local object server is invoked to serve the requested object). If, at Block 645, the request is sent upstream, then the report flag, if set in Block 607, is reset (since the upstream server/cache will create the respective clickstream log entry if needed). Note that if a URL token was part of the original request and it indicated that clickstream data collection was in effect (via a non-zero clickstream counter) and the cookie jar is not local, then the URL of the upstream request must be modified to include this token value (for the case of a cache downstream of the cookie jar that does not have a current copy of the respective requested object). Once the results are received (in the form of an outbound response message, which may be a response created according to the logic of FIG. if the request reaches the application server), then a version of the response message (which is preferably unmodified) is cached (Block 655) if necessary. (HTTP header fields in the response message contain cache control information which is used for this determination.) An "unmodified" version is the requested content as it would be served without the URL rewriting process that embeds URL tokens according to the present invention. Therefore, if a markup language document is present, Block 655 searches it for embedded URLs, and evaluates those URLs as described above with reference to Block 605 to determine if URL tokens are present; if they are, then these tokens are preferably removed before the caching occurs.

If the object is available to be served from the edge server's cache (i.e. a positive result in Block 640), then that object is retrieved (Block 650). When control reaches Block 660, an object is available for transmitting to the client. Block 660 then checks to see if the cookie jar for this transaction is stored locally. If it is, then control passes to (optional) Block 664, where rules may be executed that may override the value of the clickstream cookie that may have been set by the upstream application or which provides a default setting for the clickstream cookie.

In one aspect of the present invention, once a determination is made as to whether clickstream data will be collected for a particular transaction, the data will be collected for all messages of that transaction. The processing of Block 664 represents an optional enhancement, wherein the determination may be changed temporarily during a transaction. (For example, an application program may determine that the end user has entered a path for which gathering clickstream data will be advantageous, even though other objects the user has been viewing were not particularly interesting from a site analyzer's perspective. The application may therefore temporarily enable the data collection while the user remains in this interesting path.) Thus, Block 664 allows an existing clickstream cookie to be overridden.

Following optional Block 664, at Block 665 any cookies for this transaction (e.g. cookies received from the upstream device in the outbound response message at Block 655, and/or a defaulted or overridden clickstream cookie created in Block 664, and/or cookies retrieved from the cookie jar when processing the inbound request) are stored in this local cookie jar by Block 665, and all cookies are removed from the outbound response header.

At Block 665, a "collection mode" variable is set, based upon any change to the clickstream enablement as indicated by the clickstream cookie. If the clickstream cookie being placed in the cookie jar matches the value in the jar (including the activation flag, if used), then the collection mode is set to "SAME". Otherwise, if the clickstream cookie value being placed in the jar is null (or the activation flag is off), then the collection mode is set to "STOP". Otherwise, if the clickstream cookie value being set is non-null (or the activation flag is on), then the collection mode is set to "START".

After setting the collection mode, Block 680 then computes a URL token value using the logic as described in the second related invention (with the exception that if the collection mode is "START", then a new date and time stamp will be generated—in other words, the base token will not be re-used). The clickstream counter part of the token will then be set as follows. If the collection mode is "START", the counter will be set to one, and the URL token and current clickstream cookie are sent to the log to be reported to the site analyzer. Otherwise, if the collection mode is "STOP", then the counter is set to zero.

When the collection mode is "SAME", then the following logic is evaluated. If the base portion of the token (i.e. the part included in the hash which contains the date and time stamp) was changed, then the counter is set to zero or one, based on the original request token having a counter which was zero or non-zero, respectively, and if set to one, then the URL token and the current clickstream cookie are sent to the log to be reported to the site analyzer. If the base portion is the same, then if the original counter was non-zero, it is incremented and used as the counter in the new URL token value. Preferably, a URL token cookie is also created and stored in the local cookie jar, where this URL token cookie contains the newly-computed URL token value.

If the cookie jar is not stored locally, then (1) cookies may be present in the outbound response header if (a) it is known that the client supports cookies, or if (b) there is no cookie jar in the upstream path; and (2) if the response includes a markup language document, then URL rewriting may have been performed by an upstream device to insert URL tokens in the document. Block 670 thus checks to see if a URL token is found (either in a cookie in the response header, or in an embedded rewritten URL or from the input request). If none is found, then Block 675 sends this response message to the requester and performs any needed logging (as indicated by the setting of the "report" flag). If the teachings of the second related invention are implemented, then this send operation preferably uses the QoS information from the locally-available TQoS cookie to determine the bandwidth limitation and the values of the DSCP bits. The processing of FIG. 6 is then complete for this iteration. If any URL token is found at Block 670 which did not come from a rewritten markup language document, however, then the clickstream counter stored therein is incremented if it has a non-zero value, or is left unchanged otherwise.

After computing a new URL token for the local cookie jar (Block 680) or after finding an existing URL token and evaluating its counter (Blocks 670 and 672) when the cookie jar is not stored locally, Block 685 checks to see if there are URLs that need to be rewritten in an outbound markup language document. If the outbound document is not a markup language document, then control passes to Block 695. If the markup language document has been rewritten by an upstream server/cache, then control passes to Block 695. If the current URL token (from Block 680 or 672) has a non-zero counter value (i.e. clickstream data is being collected), then control transfers to Block 690 where the document is rewritten. Otherwise (i.e. clickstream data is not being collected), the flag manipulated in Block 615 is checked to see if the client is processing cookies, and if so, control passes to Block 695; otherwise, control passes to Block 690 where the markup language syntax is rewritten.

After the markup language is rewritten in Block 690 or if no rewriting was required in Block 685, then Block 695 adds the token as a cookie to the HTTP response headers. Now control passes to Block 700 where the response message is sent to the network layer for transmission to the next downstream device, and any required logging is performed (as indicated by the "report" flag). When the teachings of the second related invention are implemented, the transmission preferably uses the TQoS values from the locally-available URL token cookie. The processing of FIG. 6 is then complete for this iteration.

As a result of the present invention, clickstream data collection may be selectively enabled for all the object references contained in a Web page for a transaction and, via the clickstream cookie in the cookie jar, for all subsequent pages in its page flow (i.e. in its related click stream). Note that this technique not only enables the Web server to satisfy the clickstream data collection requirements when serving all objects related to the transaction and its subsequent page flow, but it also enables a cache, surrogate, or proxy to satisfy these requirements as well.

If an application server platform supports the present invention, it can do so to various degrees. First, the application or its framework can provide clickstream cookies to the edge server, and secondly it can implement the jar function locally (then its corresponding server-site edge server learns the clickstream values from the URL token cookie or by reading the URLs rewritten in markup language documents by the application server).

The present invention also allows for a hierarchy of edge servers, for example one at the edge of a server cluster and one at a branch location near the clients. By testing URLs to see if they were rewritten by an upstream node and looking for URL token cookies as well as clickstream cookies supporting the present invention, application-specific clickstream data collection information can be passed between servers without requiring this support on all servers.

When a cache server implementing the present invention receives a URL token containing a non-zero counter (indicating that clickstream data is being collected) and is able to serve the respective object from its cache, then it reports the received URL token with appropriate time stamps to the site analyzer process. This site analyzer is able to use the URL token to locate the cookie values reported earlier by the cookie jar processing logic at the node containing the respective cookie jar. Upstream servers (that is, those servers back of the node containing the cookie jar) may continue to operate as they did prior to the present invention (except that the application or application server is augmented to generate clickstream cookies and the site analyzer must be able to access the normal application server logs to complete its view of the respectively monitored page flows), in that they create log entries used by the site analyzer process. Since these log entries will now contain the respective cookies which were restored from the downstream cookie jar processing, the site analyzer process has all the information it needs to place these log entries in the overall flow along with the cache-generated log entries.

When serving cached markup language documents, the cookie jar processing logic of a cache server that implements the present invention but which does not have the cookie jar for this transaction is augmented to increment the clickstream counter by 1 if the respective counter value in the URL token of the incoming request message was non-zero. This means that the site analyzer process can trace clickstream page flows (i.e. the end user's navigation path) through cached objects to the maximum depth allowed by the width of the counter (e.g. 255 for a 1-byte counter) and see the first reference to each site object on each page of the flow.

If the request arrived at a server or cache that does not support the present invention (for example, the local browser cache), the object's URL would appear to be a unique page reference (that is, the first use in a page would not correspond to any cached object); therefore, the cache would forward the request to an upstream cache or application server, most likely resulting in it being served by a cache or edge server which does implement the present invention or by the application server itself. This means that the site analyzer process would see the respective reference.

The present invention also allows for a hierarchy of edge servers, for example one at the edge of a server cluster and one at a branch location near the clients. By testing URLs to see if they were rewritten by an upstream node supporting the present invention, clickstream data collection information can be passed between servers without requiring this support on all servers.

As has been demonstrated, the present invention provides advantageous techniques for improving collection of clickstream data in message exchanges comprising a plurality of related request and response messages. Using the disclosed techniques, clickstream data may be collected for each message exchange within the scope of a particular transaction, including requests for, and delivery of, all the related Web objects comprising that transaction. The disclosed techniques also enable collecting clickstream data for requests that are handled by cache servers, thus providing a more accurate picture of an end user's navigation than prior art techniques which may not capture such information. No changes are required on client devices or in client software. In some embodiments, no changes are required to application programs; instead, the present invention may be implemented as a server platform-based service. Changes may therefore be localized to particular devices such as edge servers. The disclosed techniques enable the clickstream data collection preferences to be processed at varying points within a network path above or at the location of the cookie jar, if any, and the present invention therefore provides a very flexible solution. The disclosed techniques enable a particular application to use varying clickstream data collection preferences for the transactions it generates, and permit administrative clickstream collection policies (e.g. based on particular URLs) to be implemented as well. Through use of clickstream cookies, server-side or edge cookie jars, and URL rewriting, these advantages are achieved with no dependency on an ability to identify a client and server by their IP address and port number combinations and no dependency on clients to support cookies.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include both the preferred embodiments and all such variations and modifications as fall within the spirit and scope of the invention.

We claim:

1. A method of providing improved clickstream data collection over a series of related messages exchanged between computers in a networking environment, comprising:

determining at a server computer a clickstream correlator value to be applied to related messages sent from a client computer, wherein the clickstream correlator value indicates whether clickstream data collection is being performed;

annotating at the server computer at least one of the related messages sent from the client computer with information reflecting the determined clickstream correlator value by storing the information reflecting the determined clickstream correlator value as part of a routing token in the annotated messages, wherein the routing token further comprises information enabling identification of the client computer and server computer;

transmitting at least one of the annotated messages with the routing token containing the determined clickstream correlator value and the information enabling identification of the client computer and server computer for delivery to the client computer;

receiving at the server computer the clickstream correlator value and the information enabling identification of the client computer and server computer that are sent from the client computer with subsequent ones of the related messages; and using the clickstream correlator value at the server computer to collect clickstream data that is indicative of how a user at the client computer interacts with content at the server computer.

2. The method according to claim 1, wherein the clickstream correlator value is used to correlate at the server computer stored log entries created for the related messages.

3. The method according to claim 1, further comprising storing the determined clickstream correlator value at the client computer for use when transmitting subsequent ones of the related messages to the server computer.

4. The method according to claim 3, wherein the determined clickstream correlator value is stored in the server computer.

5. The method according to claim 1, further comprising:

receiving the transmitted annotated message at the client computer; and automatically returning the determined clickstream correlator value from the client computer to the server computer in each subsequent one of the related messages.

6. The method according to claim 5, wherein the transmitted annotated message includes an object reference that is annotated to carry the determined clickstream correlator value, and wherein automatically returning of the determined clickstream correlator value to the server computer is enabled by receipt by the client computer of the annotation of the object reference.

7. The method according to claim 5, wherein at least one of the annotated messages is a response that serves a Web page to the client computer and wherein at least one of the subsequent ones of the related messages is a request for information referenced by the Web page.

8. The method according to claim 5, wherein at least one of the annotated messages is a response that serves a Web page to the client computer and wherein at least one of the subsequent ones of the related messages is a request for information selected from the Web page by a user of the client computer.

9. The method according to claim 1, wherein at least one of the annotated messages is a response that serves a Web page to the client computer.

10. The method according to claim 1, wherein at least one of the annotated messages is a request from the client computer for a Web page.

11. The method according to claim 1, wherein at least one of the annotated messages is a request from the client computer for a Web object.

12. The method according to claim 1, wherein the routing token is used to modify a Uniform Resource Locator from a header of selected ones of the related messages.

13. The method according to claim 1, further comprising:
using the determined clickstream correlator value when logging records reflecting the annotated messages; and
using the logged records to reconstruct a user's navigational experience during the series of related messages.

14. A computer program product for providing improved clickstream data collection over a series of related messages exchanged between computers in a networking environment, the computer program product embodied on one or more computer-readable media and comprising:
computer-readable program code that is configured to determine at a server computer a clickstream correlator value to be applied to the related messages sent from a client computer, wherein the clickstream correlator value indicates whether clickstream data collection is being performed and is used to correlate at the server computer stored log entries created for the related messages;
computer-readable program code that is configured to annotate at the server computer at least one of the related messages sent from the client computer with information reflecting the determined clickstream correlator value, and is configured to store the information reflecting the determined clickstream correlator value as part of a token in the annotated messages, wherein the token further comprises information enabling identification of the client computer and server computer; and
computer-readable program code that is configured to transmit at least one of the annotated messages with the routing token containing the determined clickstream correlator value and the information enabling identification of the client computer and server computer for delivery to the client computer;
computer-readable program code that is configured to receive at the server computer the clickstream correlator value and the information enabling identification of the client computer and server computer that are sent from the client computer with subsequent ones of the related messages; and
computer-readable program code that is configured to use the clickstream correlator value at the server computer to collect clickstream data that is indicative of how a user at the client computer interacts with content at the server computer.

15. The computer program product according to claim 14, further comprising computer-readable program code that is configured to store the determined clickstream correlator value at the client computer for use when transmitting subsequent ones of the related messages to the server computer.

16. The computer program product according to claim 14, wherein the particular computer is a client computer and the computer-readable program code that is configured to transmit, transmits one of the annotated messages to the client computer; and further comprising:
computer-readable program code that is configured to receive the transmitted annotated message at the client computer; and
computer-readable program code that is configured to automatically return the determined clickstream correlator value to a server computer in each subsequent one of the related messages.

17. The computer program product according to claim 16, wherein the transmitted annotated message includes an object reference that is annotated to carry the determined clickstream correlator value, and wherein the computer-readable program code that is configured to automatically return the determined clickstream correlator value is enabled by the annotation of the object reference.

18. The computer program product according to claim 16, wherein at least one of the annotated messages is a response that serves a Web page to the particular computer and wherein at least one of the subsequent ones of the related messages is a request for information referenced by the Web page.

19. The computer program product according to claim 16, wherein at least one of the annotated messages is a response that serves a Web page to the client computer and wherein at least one of the subsequent ones of the related messages is a request for information selected from the Web page by a user of the client computer.

20. The computer program product according to claim 14, wherein the token is used to modify a Uniform Resource Locator from a header of selected ones of the related messages.

21. The computer program product according to claim 14, further comprising:
computer-readable program code that is configured to use the determined clickstream correlator value when logging records reflecting the annotated messages; and
computer-readable program code that is configured to use the logged records to reconstruct a user's navigational experience during the series of related messages.

22. A system for providing improved clickstream data collection over a series of related messages exchanged between computers in a networking environment, comprising:

means for determining at a server computer a clickstream correlator value to be applied to the related messages sent from a client computer, wherein the clickstream correlator value indicates whether clickstream data collection is being performed and is used to correlate at the server computer stored log entries created for the related messages;

means for annotating at the server computer at least one of the related messages sent from the client computer with information reflecting the determined clickstream correlator value, and for storing the information reflecting the determined clickstream correlator value as part of a token in the annotated messages, wherein the token further comprises information enabling identification of the client computer and server computer; and means for transmitting at least one of the annotated messages with the routing token containing the determined clickstream correlator value and the information enabling identification of the client computer and server computer for delivery to the client computer;

means for receiving at the server computer the clickstream correlator value and the information enabling identification of the client computer and server computer that are sent from the client computer with subsequent ones of the related messages; and means for using the clickstream correlator value at the server computer to collect clickstream data that is indicative of how a user at the client computer interacts with content at the server computer.

23. The system according to claim 22, further comprising means for storing the determined clickstream correlator value at the client computer for use when transmitting subsequent ones of the related messages to the server computer.

24. The system according to claim 22, further comprising:
means for receiving the transmitted annotated message at the client computer; and
means for automatically returning the determined clickstream correlator value to the server computer in each subsequent one of the related messages.

25. The system according to claim 24, wherein the transmitted annotated message includes an object reference that is annotated to carry the determined clickstream correlator value, and wherein the means for automatically returning is enabled by the annotation of the object reference.

26. The system according to claim 24, wherein at least one of the annotated messages is a response that serves a Web page to the client computer and wherein at least one of the subsequent ones of the related messages is a request for information referenced by the Web page.

27. The system according to claim 24, wherein at least one of the annotated messages is a response that serves a Web page to the client computer and wherein at least one of the subsequent ones of the related messages is a request for information selected from the Web page by a user of the client computer.

28. The system according to claim 22, wherein the token is used to modify a Uniform Resource Locator from a header of selected ones of the related messages.

29. The system according to claim 22, further comprising:
means for using the determined clickstream correlator value when logging records reflecting the annotated messages; and
means for using the logged records to reconstruct a user's navigational experience during the series of related messages.

* * * * *